Oct. 27, 1936.  F. M. ROETERINK  2,059,146
FLEXIBLE ELECTRIC CABLE
Filed March 7, 1933
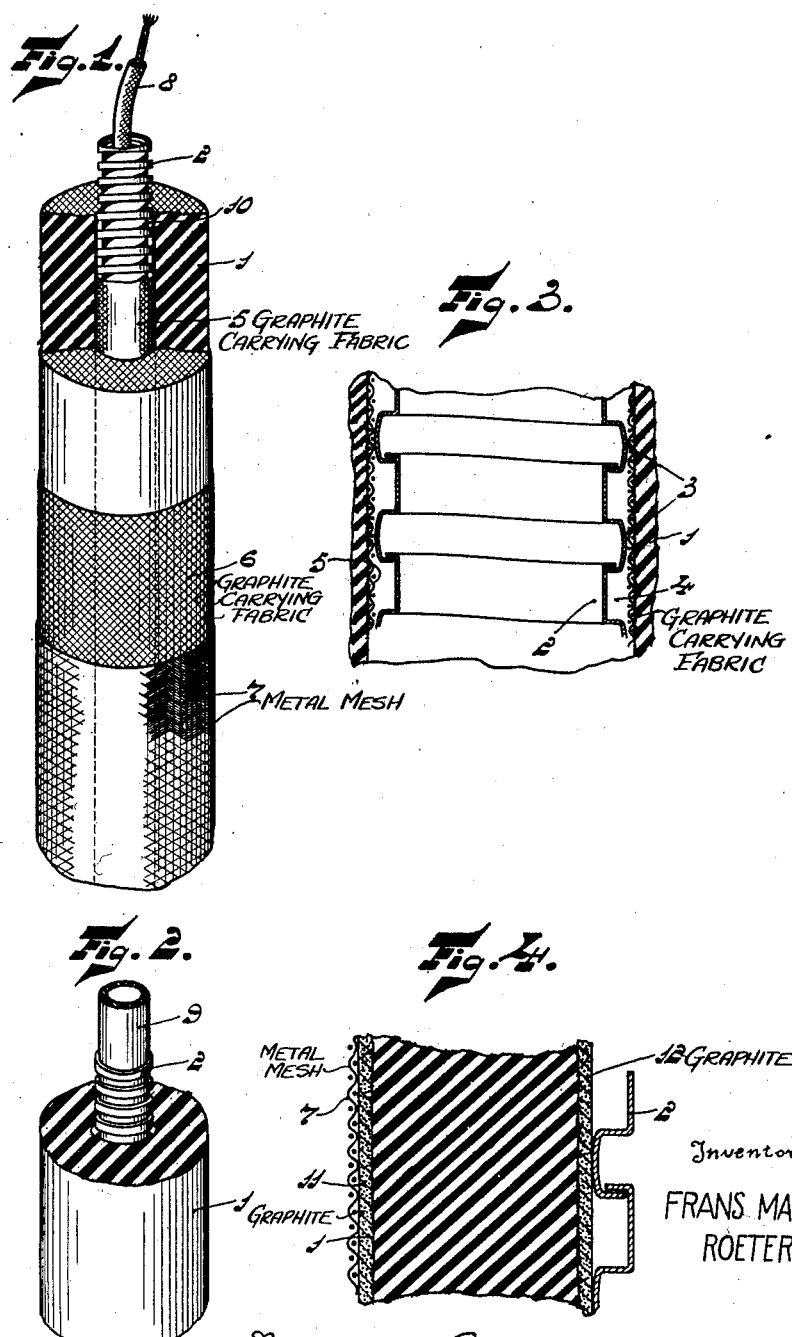
Inventor
FRANS MARIUS ROETERINK Patented Oct. 27, 1936

2,059,146

UNITED STATES PATENT OFFICE 2,059,146

FLEXIBLE ELECTRIC CABLE

Frans Marius Roeterink, Eindhoven, Netherlands, assignor, by mesne assignments, to N. V. Philips Gloeilampenfabrieken, Eindhoven, Netherlands, a Dutch company Application March 7, 1933, Serial No. 659,951
In Germany March 7, 1932

12 Claims. (Cl. 173—264)

The present invention relates to flexible electric cables. Flexible cables have been successfully used in recent years for high voltage work up to several ten-thousands of volts.

An important field of application of such flexible cables is, for instance, in the X-ray field, in which such cables serve for electrically connecting the X-ray tubes to a device which supplies the high voltage for the X-ray tube, and my invention will be more specifically described in connection with flexible cables adapted to be used for X-ray work up to two hundred thousand volts or more, although it should be well understood that my invention can be applied equally well to other fields requiring high voltage cables.

Such flexible cables consist of a conductor, or conductors, forming the core of the cable, and surrounded by a yielding insulating sleeve, consisting for instance, of a resilient rubber tube. The insulation must be able to withstand the maximum voltage differences which may occur between the conductor and any portions of the system with which the outer surface of the insulation may come into contact. For instance, in case of a metal-clad grounded cable, thus of a cable in which the insulator is surrounded by a metal protective sleeve which is connected to ground, the voltage which the insulator has to safely withstand is the maximum voltage difference which may exist between the conductor of the cable and ground.

The difficulty in extending the use of flexible cables for very high voltage work is due to the fact that the higher the voltage the greater the required diameter of the cable to provide satisfactory electric protection and avoid breakdown of the insulation, and thus it becomes increasingly difficult to retain sufficient flexibility.

It is evident that the higher the voltage the thicker the insulation layer required and this is one reason for the increase in the diameter of the cable.

In addition, however, it has been found that for high voltages the diameter of the conductor itself should preferably be increased beyond the value which would be required for reasons of sufficient current-carrying capacity and mechanical strength. This is due to the following: for a given voltage the field strength or concentration of electric lines increases inversely with the diameter of the conductor and thus by increasing the diameter of the conductor the field strength is reduced and the danger of puncturing of the insulation decreased.

Besides the two above-stated reasons requiring increase of the cable diameter, there exists still a third reason in present-day flexible cables, and this is due to the fact that the actual breakdown voltage of a flexible cable is in practice much lower than is the theoretically computed breakdown voltage, and that unexpected breakdowns occur at a given thickness of insulation and at a given voltage, although the insulation according to computations should safely withstand such voltage, and consequently the insulation provided on flexible cables is as a rule, greatly in excess of that which would be theoretically required, and even so, unexpected breakdowns are not altogether eliminated.

I have found that the phenomenon just described is due to the following reasons:

To obtain an increase in diameter of the supply conductor, and at the same time retain sufficient flexibility, the conductor of the flexible cable as a rule consists of a plurality of strand wires or of a helically-wound band. In either case the conductor has an uneven surface opposing the insulator which has two drawbacks. First, interspaces are formed between the conductor and the surrounding insulator which cannot be properly filled out without reducing the flexibility of the cable.

However, as the inside wall of the insulator does not assume a definite potential, but at any given point its potential depends on the electric field distribution around this point, any cable portion may assume a potential which may greatly differ from that of the conductor portion opposing same. Thus a high potential-difference may exist between any portion of the insulator and the opposing portion of the conductor, and consequently the air in the interspace between same may become highly charged. These electrically-charged air-pockets give rise to the formation of chemically active gases such as ozone which attack the insulation and cause its gradual destruction.

Secondly, the uneven surface of the conductor gives rise to uneven distribution of the electric field with the consequent local concentration of electric lines, and wherever a high concentration of the electric field occurs the danger of puncturing of the insulation greatly increases.

One object of my invention is to obviate the above difficulties and prevent both the electric charging of the air in the interspaces between the conductor and surrounding insulator, as well as to prevent uneven distribution of the electric field due to the unevenness in the surface of the conductor.

A further object of my invention is to provide for a uniform electric field distribution along the whole inner surface of the insulator.

A still further object is to provide the entire inner surface of the insulating tubing with the same potential as the conductor.

A still further object of my invention is to provide a uniform potential difference between the inner surface and outer surface of the insulating tubing of the cable over its whole length.

A still further object of my invention is to provide a highly flexible conductor for the cable, which conductor is not firmly gripped by the insulating tubing of the cable, and at the same time electric potential differences between the conductor and the inner surface of the insulating tubing are avoided.

A still further object of my invention is to provide a uniform field distribution along the whole cable and a uniform potential difference between the inner and outer surface of the cable with a consequent reduction in the thickness of the insulation.

A further object of my invention is to provide a high-voltage cable of unusual flexibility.

A further object of my invention is to provide a flexible high voltage cable having two or more conductors which have a low mutual voltage difference and a high potential difference with respect to ground.

Further objects of my invention will appear as the specification progresses.

The flexible high voltage cables according to my invention are in the main similar to those of standard design and comprise a tubular body of flexible or resilient material, for instance, of suitable rubber in which the core is formed by the electric conductor.

While in the further description I shall generally refer to a cable having a single tubular passage and a single conductor it should be well understood that my invention is equally well applicable to a cable provided with a plurality of conductors.

According to the invention the inner surface of the insulating body, hereafter referred to as the insulating tubing, is smooth and does not firmly engage the conductor. This inner surface of the insulating tubing is provided with an electrically-conductive layer substantially over its entire surface and this layer electrically contacts at a sufficiently large number of points with the conductor which it surrounds.

As a result thereof, disregarding the generally negligible voltage drop in the conductor, the inside wall of the insulator has the same potential over the whole length of the cable and this potential is the same as that of the conductor. Even should a potential drop of importance occur in the cable the electrical contacts provided all along the cable between the conductor and the conductive layer will prevent a potential difference between any portion of the conductor and the conductive layer opposing same. The air enclosed in the space between the conductor and the inner wall of the insulating tubing can not be subjected to potential differences and therefore remains uncharged; consequently the development of detrimental gases and the deterioration of the insulating tubing is prevented.

The conductor should be flexible and thus exhibit comparatively small resistance to bending, and at the same time should exhibit a comparatively large resistance to the alteration of its shape and cross-section. This conductor may act itself as the supply conductor, carrying the whole current, or may surround an additional conductor or conductors of suitable flexibility with which it makes electric contact, or from which it is insulated for relatively low voltage.

This flexible conductor may, in one form of my invention, enclose one or more flexible hose, for example of rubber, which forms a passage for cooling liquid, a current of air or compressed gas.

In the preferred form of my invention the above conductor consists of a flexible metal tubing of the well-known type, as used for flexible shafts or for the protective covering of flexible hose or cables. Such a flexible metal tube, as is well known, consists of convolutions which engage each other and which may be telescoped into each other to a varying extent. The metal tube used has sufficient flexibility not to cause deformation of the surrounding insulating body, even if the cable is subjected to extreme bending, and at the same time has sufficient rigidity to resist without deformation strong mechanical forces.

As a further improvement, according to my invention, and especially in the case of the so-called armored cables in which the insulating tube is surrounded by a metal protecting envelope, which as a rule is grounded in operation, I prefer to provide the insulating tube with a smooth outer surface which is also coated or otherwise provided with an electrically conductive layer.

This feature further increases the uniformity of the electric stress to which the insulation of the cable is subjected, as in this case the insulation is surrounded both inside and outside by two conductive layers intimately contacting with the insulation. As each layer has a uniform potential throughout the whole length of the cable, the voltage difference applied to the insulation will also be the same for any portion of the cable.

Thus unexpected breakdowns due to local concentration of the electric field are avoided and the thickness of the insulating layer may be reduced to the theoretically computed values without the risk of breakdown.

In providing the layer care is taken not to reduce the flexibility of the cable, this being achieved, for instance, by applying to the smooth inner surface of the insulating tubing a finely divided conductive substance, for example, a graphite suspension, known under the registered trade-mark "Aquadag". While the conductive layer may be applied directly to the smooth inside surface of the insulating tubing, in the case of rubber insulation I prefer to provide inside of the insulating tubing a sleeve of textile fabric of fine mesh which acts as the carrier for the conductive layer. This sleeve tightly fits into the insulating tubing.

What has been said in regard to the inner conductive layer applies in the same way to the outer conductive layer if such is to be applied to the cable.

It should be well understood that the conducting layer does not need to have a high conductivity nor does it need to take part to any material extent in the conduction of the current as it has merely to provide for a uniform potential corresponding to that of the supply conductor along the wall or walls of the insulating tubing.

Irrespective of whether the cable is straight or bent in any way, there will always be a sufficient number of contacting points between the flexible metal tube and the inner surface of the conductor layer to keep the two at the same potential.

Preferably all sharp edges are avoided on the flexible metal tube by proper rounding of the edges of the convolutions, where these may come into contact with the conductive layer so as to avoid the scraping off of this layer. Preferably the contacting surface of the flexible metal tube is further smoothened by polishing same.

My invention will be more clearly understood by reference to the accompanying drawing, representing by way of example one embodiment thereof:

Figure 1 is a perspective view partly in section of a portion of a cable embodying my invention, Figure 2 is another perspective view, showing a cable with a flexible hose enclosed therein.

Figure 3 is an enlarged schematic and partly sectional view of the supply conductor with the surrounding insulating tube.

Figure 4 is a sectional view on a still more enlarged scale of a portion of the cable showing a slightly different mode of performance.

Referring to the drawing, the insulating tube I is of flexible material, for instance, of sufficiently yielding rubber. As a rule I prefer to use a high quality resilient rubber tubing.

As shown in the drawing, the tube I is provided with a single tubular passage 10 adapted to receive one or more supply conductors; a flexible metal tubing 2 forms the core of the cable and as shown, acts as the current-supply conductor for the current.

The tubing 2 consists of a helically-wound metal band, which in well-known manner forms convolutions which have S-shaped profiles; adjacent convolutions engage each other by means of their edges and can be individually telescoped into each other. The metal used for the band has preferably some elasticity and for instance, tombac, an alloy consisting principally of copper and zinc, has been found a suitable material for this purpose.

Such a flexible metal tubing, as is well known, can be conveniently bent and considerably varied in length, as the individual turns may be readily and individually telescoped into each other along part or the whole of their periphery.

If desired, the material used for the tube may be a metal or an alloy, for instance an alloy consisting of copper, silicon and manganese in the ratio of about 96:3.5:0.5%, having considerable stiffness so that a very high resistance to the deformation of its shape and cross-section is provided.

In case the flexible metal tube has insufficient electrical conductivity it is desirable to provide within the flexible metal tube additional flexible conductors of suitable current-carrying capacity. Such an additional conductor may also be provided if the cable serves for supplying current from a low tension source having a high potential difference with respect to ground, such as is the case in X-ray installations for the energizing current of the incandescent cathode or for measuring purposes whereby two conductors of the cable form portions of the same high tension wire. Such an additional conductor is shown at 8 in Fig. 1.

In the fragment of the cable shown in Fig. 2 there is no additional wire, but the flexible metal tube 2 encloses here a rubber hose 9 which may be utilized for supplying a cooling liquid through the cable. This may be done for example with advantage in X-ray installations where the cable serves for supplying high tension to the anticathode of an X-ray tube which is to be cooled by water circulation. The rubber hose 9 is also adapted to form a passage for a current of air or for the supply of compressed gas.

As shown in Fig. 3 on an enlarged scale, there is formed between the turns of the metal tube 10 and between the inner wall of the insulating tube an air-space having the form of a helical groove.

As has been stated, the air-space between the conductor and the insulating sleeve cannot be filled out without considerably reducing the flexibility of the cable. On the other hand, the groove constitutes air-pockets and unless the provisions according to the invention are made the air in the groove might become highly charged, with the resulting formation of chemically active gases, which would attack the insulating material, decomposing the same and causing its ultimate breakdown. Such breakdown would be further promoted by the high concentration of the electric field at the hooked edges of the metal band.

These drawbacks are avoided by providing the whole surface of the wall of the passage 10 of the insulating tube with a suitable electrically conductive layer which electrically contacts with the metal tubing 2 at a sufficiently large number of points. The conductivity of the layer does not need to be greater than is sufficient to obtain a uniform potential—corresponding to that of the conductor 2—along the whole length of the cable.

A convenient method of providing the conducting layer is by inserting a sleeve 5 of a finely-meshed textile fabric between the supply conductor 2 and the tubing 1, which fabric acts as a carrier for the conductive layer, being composed, for example, of a conductive graphite suspension known under the trade-mark of "Aquadag". Thereby the conductive sleeve 5 is in intimate contact along its whole length with the tube 1 and is electrically contacting at a sufficiently large number of points with the turns 3 of the conductor 2 irrespective of whether the cable is straight or is bent in one way or another.

To prevent the scraping off of the conductive layer by the conductor 2, it is preferable to highly polish the same and also to avoid sharp edges on the same wherever it may contact with the conductive layer. As shown in the drawing, the edges of turns 2 are rounded off.

Preferably, and especially in connection with armored cables, I also provide a conductive layer on the smooth outer wall of the insulating tubing 1, for instance, again by having a finely-meshed textile fabric sleeve 6, for instance of linen, tightly engaging the outer wall of the insulating tubing 1 along its whole length, to which sleeve is applied a suitable conductive substance similar to that applied to the inner sleeve 5. The conductive sleeve 6 is surrounded by the metal covering 7 of meshed wire or the like, and is in electrical contact therewith.

Disregarding the usually negligible voltage drop in the conductor the potential difference now existing between the conductive layers 5 and 6 is quite definite and is the same for any portion of the cable, or if the potential drop in the cable may not be disregarded this holds at least for each cross-section. Thus a homogeneous field prevails between the concentric surfaces of the layers 5 and 6, and the interspace between these surfaces is completely filled up with an insulating material of uniform characteristics.

Consequently no undesired concentration of the lines of force can take place and as the insulation is not subjected to the damaging action of ionization, the actual and the computed breakdown voltages of the insulation are the same, and the safety factor in determining the thickness of the insulating layer can be greatly reduced.

It should be well understood that instead of providing the conductive layer on a separate carrier it can be deposited directly on the inner as well as the outer surfaces of the insulating tube. This modification is shown in Fig. 4. The outer layer of conductive material directly applied to the insulating tube I is denoted by II and the inner insulating layer by 12. However, in the case of materials to which the conductive layer does not well adhere, it is preferable to provide a separate carrier for the conductive layer, which, however, has to tightly adhere to the insulating tubing.

It should also be understood that in case of armored cables, the metal netting 7 may be further surrounded by a suitable layer consisting, for instance, of cotton fabric or rubber, etc., to prevent chemical attack of the armor, as well as for the more convenient handling of the cable.

From the foregoing it thus appears that according to my invention, highly flexible cables can be obtained for high voltage work, which are characterized by a conductor consisting of flexible metal tubing of high flexibility which may act as the sole supply conductor, or which may surround additional conductors consisting of stranded wires or a helically-wound band of high flexibility. The flexible metal tubing is not tightly gripped by the insulating tubing, but can conveniently adjust itself within said tubing and at the same time objectionable electric charging of the air in the conductor-insulator inter-space, and uneven distribution and local high concentration of the electric field are avoided.

The cable of my invention is further characterized by the provision of a uniform potential on the inner wall of the insulating tube which potential has the same value as the potential of the supply conductor, and also by the provision of a uniform potential around the outer wall of the cable and by a uniform potential difference between the inner wall and outer wall of the cable. The combined result is that the actual breakdown voltage of the insulating tubing of my cable corresponds to the theoretically computed value without the necessity for safety margins for unexpected breakdowns, which thus permits reduction of the thickness of the insulation.

The provision of a highly flexible conductive core, the absence of a tight engagement of the flexible core by the insulating tubing, and the reduction in the thickness of the insulating tubing, result in a cable construction which shows a satisfactory flexibility for very high voltages up to several hundred thousand volts.

For instance, flexible cables, according to the invention, have been successfully used in mobile shockproof X-ray installations up to 200,000 volts and more, for the connection of the X-ray tube to the transformer or rectifying device, supplying the operating voltage for the tube.

In this case the cable connecting the anode of the X-ray tube is supplied with a special conduit passing through the flexible metal tube of the cable which supplies the cooling water for the anode and which as a rule consists of rubber, as shown at 9 in Fig. 2.

While I have described my invention in connection with a specific construction and have stated a specific application thereof, it should be well understood that I do not wish to be limited to such construction and application; nor need all of the novel features of my invention be combined in the cable as some of these features may be individually used with great benefit. I therefore desire the appended claims to be construed as broadly as permissible in view of the prior art.

What I claim is:

1. A flexible high voltage cable, comprising a tubular body of yielding insulating material having a smooth inner surface, a conductive film in intimate contact with said surface, and a flexible conductor having substantially the same potential as said film, said conductor having portions readily movable axially with relation to said inner surface.

2. A flexible high-voltage cable comprising a body of yielding insulating material provided with a tubular passageway having a smooth surface, a conductor consisting of an articulated flexible metal tubing of substantially circular cross section disposed within said passageway and readily movable relative to the surface thereof, and a conductive film in intimate contact with said surface and having substantially the same potential as said tubing to prevent the electrostatic charging of air spaces present between said film and tubing.

3. A flexible high-voltage cable comprising a rubber tube having a smooth inner surface, an articulated flexible metal tube of substantially circular cross section disposed within said rubber tube and acting as a supply conductor, and a conductive film in intimate contact with the inner surface of said rubber tube over substantially the entire extent thereof, said metal tube having portions in electrical contact with said conductive film and being readily movable relative to said film, said film serving to prevent the electrostatic charging of air spaces present between the film and the metal tube.

4. A flexible high-voltage cable comprising a yielding tubular body of isotropic insulating material, a conductive film in intimate contact with the inner surface of said body, an articulated flexible metal tube disposed within said tubular body and having portions in electrical contact with said film, said metal tube being readily movable relative to said film and body, said conductive film serving to prevent the electrostatic charging of the air spaces present between said metal tube and film, and an electric supply conductor disposed within said metal tube.

5. A flexible electrical cable for high voltages comprising, a tube of yielding insulating material having a smooth inner surface, a conductive film in intimate contact with the inner surface of said tube, and a metal tube disposed within said insulating tube and having portions engaging said conductive film and readily shiftable along same, said metal tube comprising a helically wound metal band having convolutions which engage each other, the corners of said convolutions being rounded.

6. A flexible high voltage cable, comprising a tubular rubber body having a smooth inner surface, a graphite film applied to said surface, and a flexible conductor having substantially the same potential as said film within said tubular body, said conductor having portions readily movable axially with relation to said inner surface.

7. A flexible high voltage cable, comprising a tubular body of insulating material having smooth inner and outer surfaces, conductive films on both said surfaces, and a flexible conductor disposed within said tubular body, said conductor having substantially the same potential as the conductive film on said inner surface and having portions readily movable axially relative to said film.

8. A flexible high-voltage cable comprising a tubular rubber body, a sleeve-shaped member within said tubular body and in intimate contact therewith, said sleeve member consisting of a textile fabric provided with a conductive coating, and an electric conductor within said sleeve member and having portions which electrically contact with said conductive coating and which portions are relatively displaceable along said coating.

9. A flexible high-voltage cable comprising a tubular rubber body, a conductive layer within said body and comprising a finely divided conductive substance and a reticular fabric acting as a carrier therefor, said conductive layer being in intimate contact with the inner surface of said tubular body, and an electric conductor consisting of an articulated flexible metal tubing within said conductive layer and having portions which electrically contact with said layer and are freely displaceable along said layer.

10. A flexible cable for use with a voltage of at least 100,000 volts comprising a tubular body of yielding insulating material, a conductive film covering the inner surface of said body, and an articulated flexible metal tube of substantially circular cross section disposed within said tubular body, said metal tube having portions in electrical contact with said conductive film so that said conductive film assumes over its entire surface the same potential as that of the metal tube, said portions being readily shiftable along said conductive film and having a polished surface and rounded edges.

11. A flexible high-voltage cable comprising a yielding tubular body of isotropic insulating material, a conductive layer within said body and in intimate contact with the inner surface thereof, an articulated flexible metal tube disposed within said body and having portions in electrical contact with said conductive layer said portions being easily shiftable along said layer, and an electric conductor located in said flexible metal tube and insulated therefrom for low tension.

12. A flexible high voltage cable comprising a tubular body of yielding insulating material, a conductive layer within said body and in intimate contact with the inner surface of said body, a metal band helically wound to form a flexible metal tube having convolutions which engage each other and disposed within said tubular body and having portions engaging said conductive layer and a flexible imperforate hose located in said flexible metal tubing.

FRANS MARIUS ROETERINK.